United States Patent [19]
Keller et al.

[11] Patent Number: 6,025,453
[45] Date of Patent: Feb. 15, 2000

[54] LINEAR INORGANIC-ORGANIC HYBRID COPOLYMERS CONTAINING RANDOM DISTRIBUTION OF BORANYL, SILYL, OR SILOXYL, AND ACETYLENIC UNITS

[75] Inventors: Teddy M. Keller; Raj A. Sundar, both of Alexandria, Va.

[73] Assignee: The United States of America as represented by the Secretary of the Navy, Washington, D.C.

[21] Appl. No.: 08/686,947

[22] Filed: Jul. 26, 1996

[51] Int. Cl.$^7$ .................................................... C08G 79/08
[52] U.S. Cl. ..................................... 528/4; 528/5; 528/25; 528/33; 528/34; 528/35
[58] Field of Search ................................ 528/4, 5, 33, 34, 528/35, 25

[56] References Cited

U.S. PATENT DOCUMENTS

| | | | |
|---|---|---|---|
| 5,272,237 | 12/1993 | Keller et al. | 525/5 |
| 5,292,779 | 3/1994 | Keller et al. | 528/5 |
| 5,844,052 | 12/1998 | Keller et al. | 528/4 |
| 5,874,514 | 2/1999 | Keller et al. | 528/35 |

*Primary Examiner*—Melvyn I. Marquis
*Attorney, Agent, or Firm*—Barry A. Edelberg; John A. Karasek

[57] ABSTRACT

An organoboron polymer having a backbone with a repeating of at least one alkynyl group, at least one silyl group, at least one boranyl group, optionally at least one siloxyl group, and optionally an aryldisilyl group. The boron containing units in and the silicon containing units can be arranged in either random occurrences between each other or in the form of interdispersed block-type structures of each unit. The hybrid polymer is useful for making high temperature, oxidatively stable thermosetting plastics and for microelectronic applications via crosslinking to three-dimensional inorganic-organic hybrid polymers.

14 Claims, 6 Drawing Sheets

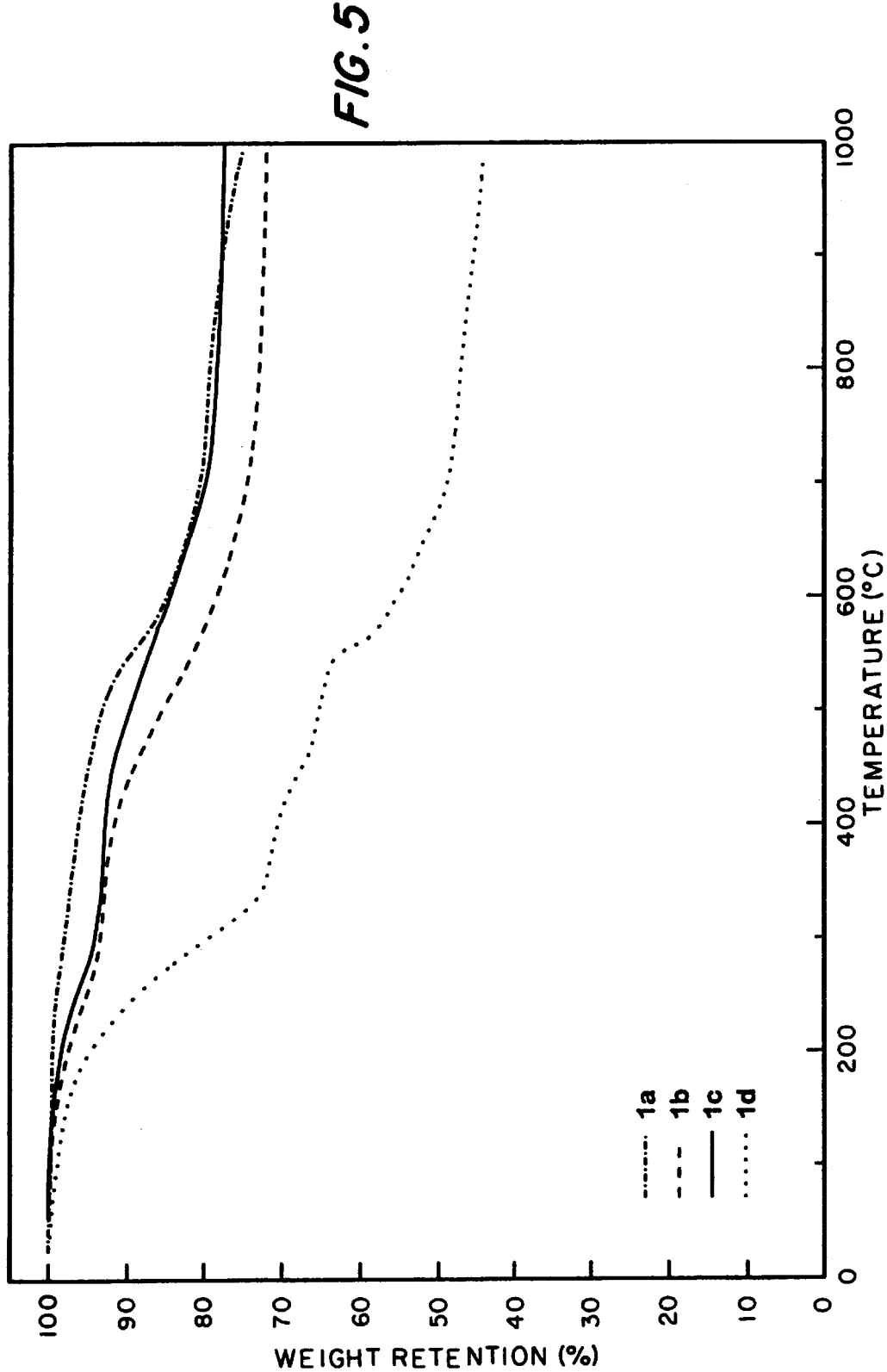

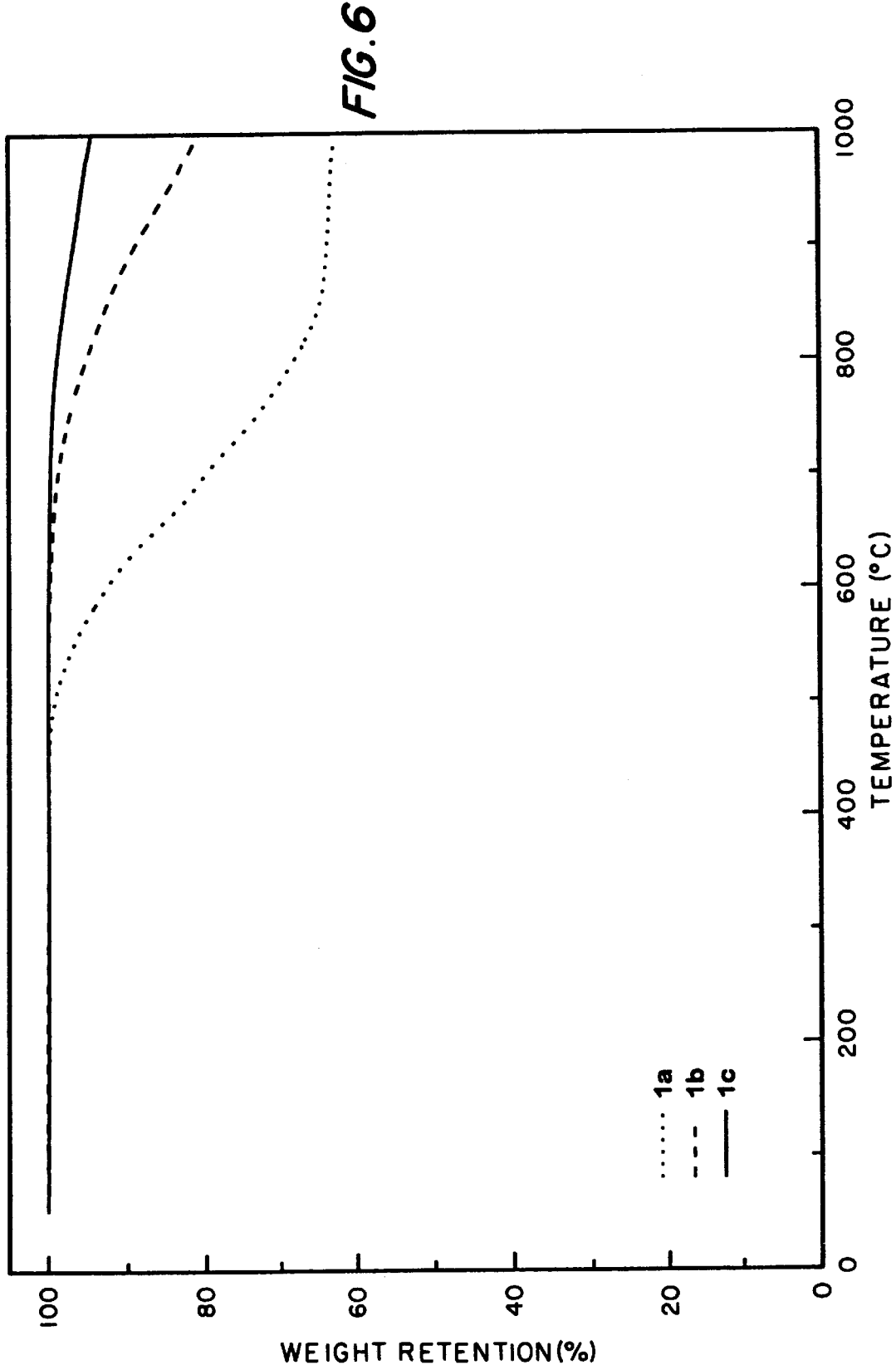

LINEAR INORGANIC-ORGANIC HYBRID COPOLYMERS CONTAINING RANDOM DISTRIBUTION OF BORANYL, SILYL, OR SILOXYL, AND ACETYLENIC UNITS

BACKGROUND OF THE INVENTION

1. Field of the Invention

This invention relates to novel boron-siloxane acetylenic or boron-silane acetylenic polymers.

2. Description of the Previously Published Art

Thermally stable polymeric elastomers consisting of alternating carborane and siloxane groups are known for both the deca- and penta-carboranes ($HCB_{10}H_{10}CH$ and $HCB_5H_5CH$ respectively). See, for example, U.S. Pat. No. 3,463,801. Some have been produced commercially. However, these materials do not contain alkynyl moieties such as acetylenic groups or any other functional group for crosslinking purposes to produce thermosetting polymers. These poly (carborane-siloxane) elastomers show superior thermal (high chars) and oxidative properties (low weight loss) at elevated temperatures (900° C.) compared to analogous poly(siloxanes) as monitored by TGA.

Silylene or siloxane-acetylene and silylene or siloxane-diacetylene polymers have also been reported. See, for example, U.S. Pat. No. 5,483,017. Good quality fibers can be drawn from the melts of the silylene-based polymers (visual melt ca. 120° C.) and the fibers can be crosslinked either thermally or with UV light, but they lack the thermally and oxidatively stable boranyl units of the present invention.

More recently, linear inorganic-organic hybrid polymers containing acetylenic and either bis(silyl or siloxyl) carboranyl units or a random distribution of both bis(silyl or siloxyl)carboranyl and bis(silyl or siloxyl) units have been described and are under development at the Naval Research Laboratory. See, for example, U.S. Pat. No. 5,272,237. However, these polymers contain carborane units in each repeating unit which add to their cost.

More recently, less costly copolymers containing a random distribution of both carborane-siloxane acetylenic and siloxane or silane acetylenic units have been synthesized and are under investigation at the Naval Research Laboratory.

3. Objects of the Invention

It is a object of this invention to provide boron-siloxane acetylenic polymers or boron-silane acetylenic polymers hereafter referred to as novel copolymers which are extremely easy to process into thermosets since in the preferred forms they are either liquids at ambient temperature, low melting solids, or low temperature processing glassy materials.

It is a further object of this invention to provide a method for the syntheses of these novel copolymers in a simple one-pot reaction which proceeds in high yield.

It is a further object of this invention to provide a method for the syntheses of these novel copolymers by controlling the ratio of reactants in the syntheses so that different percentages of boron and silicon can be obtained in the resulting copolymer.

It is a further object of this invention to provide a method for the syntheses of these novel copolymers by controlling the relative amount of the boron and silicon units to the alkynyl unit depending on the physical properties desired.

It is an further object of this invention to provide for novel linear polymers that are soluble in most organic solvents so as to be useful in structural, microelectronic, and nonlinear optical (NLO) applications.

It is a further object of this invention to provide for novel copolymeric precursors which are used for making both high temperature, oxidatively stable thermosets and ceramics.

It is a further object of this invention to provide for novel copolymeric precursors which are cross-linkable by thermal or photochemical means through the triple-bonds of the acetylenic units to form thermosetting polymers.

It is a further object of this invention to provide novel copolymers which eliminate the carborane component and replace it with a simple aryl substituted boron unit in the copolymer while still retaining excellent thermal and thermooxidative stabilities at elevated temperatures.

It is a further object of this invention to provide novel polymeric materials which provide the desirable features of inorganics at elevated temperatures such as high thermal and oxidative stability and the desirable features of organics such as processability.

It is a further object of this invention to provide novel copolymers which contain silyl, and/or siloxyl, and/or aryldisilyl, boranyl, and acetylenic units in the backbone.

It is an further object of this invention to provide novel copolymers containing flexible siloxane or silane units which maintain processability in the copolymer and which also contribute to high temperature stability due to their own inherent thermal stability.

It is a further object of this invention to provide novel boron-silicon-acetylenic containing polymers having superb processability and outstanding thermal and oxidative stability due to the organic constituents and due to the unique combinations of boranyl and siloxane or silane units, respectively.

It is a further object of this invention to provide novel copolymers which contain silyl and boranyl units and which exhibit electrical conductivity properties and which are suitable for use in the microelectronic industry and for use as nonlinear optical materials (NLO).

It is a further object of this invention to provide novel copolymers with various electrical properties which can be easily synthesized by varying the substituents on both the boron and silicon units.

These and further objects of the invention will become apparent as the description of the invention proceeds.

SUMMARY OF THE INVENTION

This invention relates to a class of novel linear inorganic-organic hybrid random copolymers of varying molecular weight that may be useful for making high temperature, oxidatively stable thermosetting plastics and for microelectronic applications via crosslinking to three-dimensional inorganic-organic hybrid polymers. These new materials have repeat units that contain alkynyl groups for crosslinking purposes along with a random distribution of boranyl units and either silyl, siloxyl, or aryldisilyl groups which are designed to take advantage of the thermooxidative stability of inorganics and the processability of organics. Since these novel linear polymers are either viscous liquids at room temperature, low melting solids, or low temperature processing glassy materials and are soluble in most organic solvents, they can be easily fabricated into shaped components, which enhance their importance for high temperature structural and microelectronic applications. Crosslinking of alkynyl groups is known to occur by either photochemical or thermal processes.

BRIEF DESCRIPTION OF THE FIGURES

FIG. 5 illustrates TGA thermograms of copolymers 1a–d according to the invention heated to 1,000° C. under a nitrogen atmosphere at 10° C./min.

FIG. 6 illustrates TGA thermograms of copolymers 1a–c according to the invention heated to 1,000° C. in air at 10° C./min.

DESCRIPTION OF THE PREFERRED EMBODIMENTS

Figure 1:
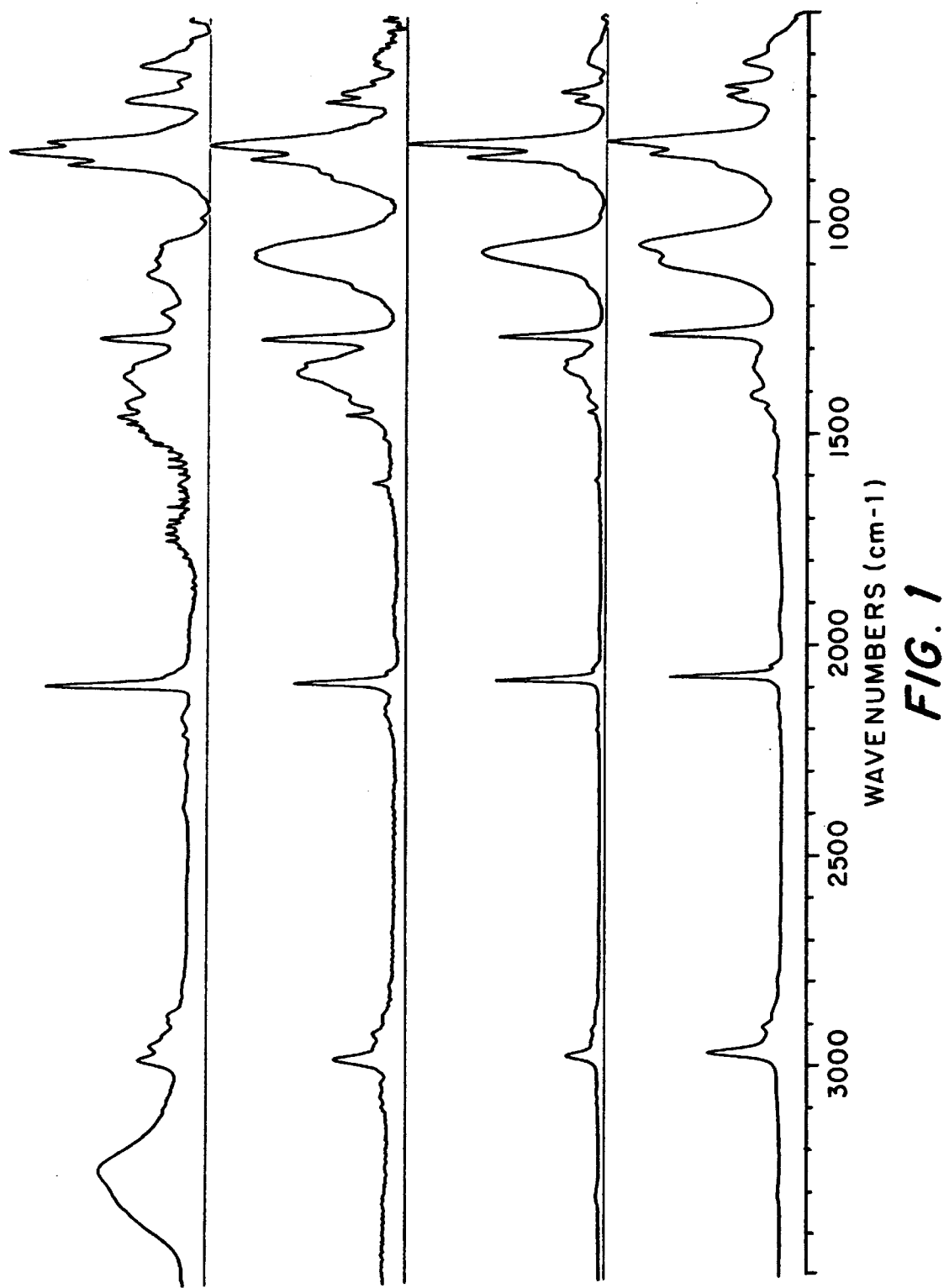
FIG. 1 illustrates the FTIR spectra (absorbance) of hybrid copolymers according to the invention.

The novel linear inorganic-organic hybrid organoboron copolymers with a backbone having a repeating unit comprising at least one alkynyl group, at least one silyl group, at least one boranyl group, optionally at least one siloxyl group, and optionally an aryldisilyl group wherein said repeating unit is represented by the formula 1

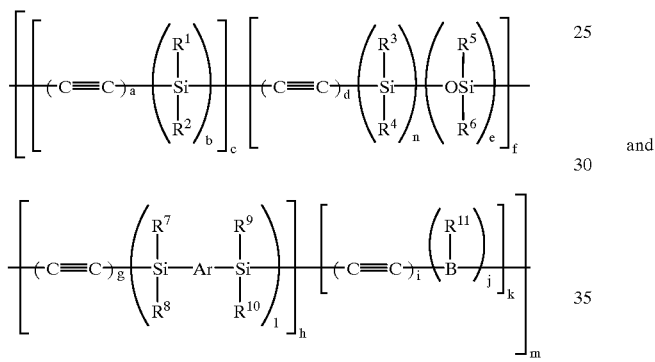

wherein
(1) c, f, h and k are mole percent and add together to 100 mole percent with the ratio of the sum of c, f and h to k varying from 99:1 to 0:100;
(2) a, b, d, e, g, i, j, l and n are each an integer greater than zero;
(3) m is an integer equal to or greater than 1;
(4) wherein $R^1$ through $R^{10}$ are independently selected from a haloalkyl having up to 20 carbon atoms; a haloaryl group having up to 20 carbon atoms; and an alkyl, aryl, or alkylaryl hydrocarbon group having up to 20 carbon atoms; and
(5) $R^{11}$ is an alkyl, aryl or alkylaryl hydrocarbon group having up to 20 carbon atoms;
(6) Ar is a substituted or unsubstituted aromatic diradicals having 4 or fewer aromatic rings; and
the boron containing units in the molar percent amount k and the silicon containing units in the molar percent amounts c, f and h can be arranged in either random occurrences between each other or in the form of interdispersed block-type structures of each unit.

Thus the acetylenic groups in the copolymer are separated randomly by either a boranyl group and a siloxyl, silyl or aryldisilyl units. The syntheses of these copolymers are straightforward and high-yielding.

The copolymer 1 can be made by reacting a salt or Grignard agent having the formula $$M-(C\equiv C)_n-M$$

wherein
(1) M is Li, Na, K or MgX and where X is F, Cl Br, or I,
(2) n is a positive integer of 1 or greater; with appropriate members selected from

(4a)

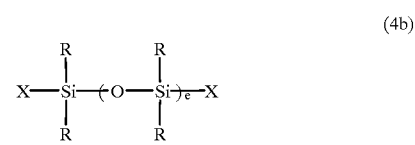

(4b)

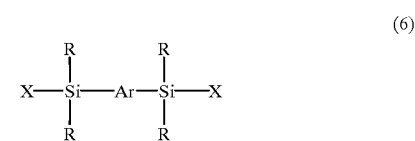

(6)

and

(5)

wherein
Ar, e, X, and $R^{10}$ are as previously indicated and R is as $R^1$ through $R^{11}$ are defined.

As an example, the synthesis of an exemplary member of copolymer 1 is depicted in Scheme 1 using specific exemplary compounds for the generic components 4 and 5 (with 6 not being used in this instance).

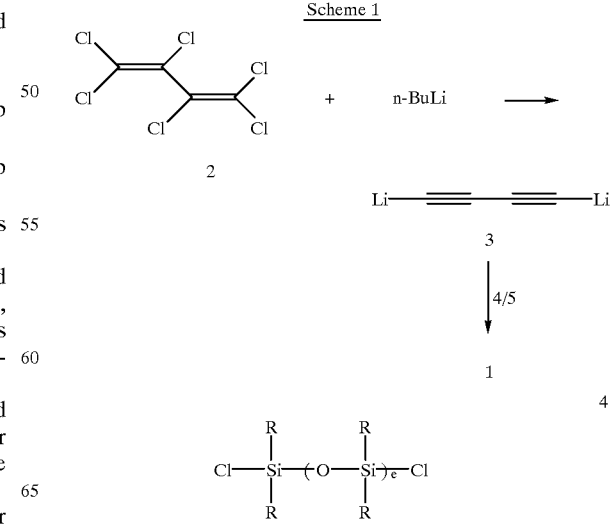

Scheme 1

-continued

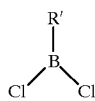

The reaction of hexachlorobutadiene 2 with four equivalents of n-butyllithium affords dilithiobutadiyne 3. Injecting a mixture of 1,3-dichlorotetramethyldisiloxane 4 and the phenyldichloroboron 5 yields copolymer 1 after aqueous workup. A random distribution of units in the copolymer should be obtained since the reactivities of 4 and 5 towards 3 are very similar. Moreover, it should be possible to obtain block copolymers by adding 4 or 5 separately or in a stepwise manner. Thus it is possible to have the boron containing units and the silicon containing units arranged in the form of interdispersed block-type structures of each unit.

These are the first polymers that contain silyl or siloxyl, boranyl, and acetylenic units in the backbone. The major advantage of the hybrid approach, which these new materials illustrate, is that the desirable features of inorganics such as the unique combinations of boranyl and siloxane or silane units, results in high thermal and oxidative stability at elevated temperatures while the organic constituents result in processability properties that are incorporated into these novel polymeric materials. These polymers, which exhibit superb processability, can be readily cross-linked through the acetylenic groups yielding high temperature thermosetting polymers and ceramics that exhibit outstanding long term thermal and oxidative properties.

Copolymers 1 present the unique option of eliminating the carborane component and replacing with a simple phenyl substituted boron unit in the copolymer while still retaining excellent thermal and thermooxidative stabilities at elevated temperatures.

The syntheses of these copolymers are simple one-pot reactions and proceed in high yield. The setup of this reaction makes it simple to change the chemical makeup of these copolymers by varying molar ratios of 4 and 5 used. For example, substituting trichloroethylene in place of 2 leads to a copolymer containing only one triple bond in the repeat unit. Substituting 1,5-dichlorohexamethyltrisiloxane (b=2) for 4 would increase the length of the siloxane spacer in the copolymer. The flexible siloxane or silane units maintain processability in the copolymers and also contribute to high temperature stability due to their own inherent thermal stability.

Another important way to modify the chemical composition of the polymer is to change the siloxyl, silyl, or aryldisilyl/boranyl ratio in the reaction. In this manner, the percentage of boron and silicon in the copolymer can be easily adjusted. Changing any of the variables mentioned above can lead to copolymers of different properties. Thus, it is possible to tailor a copolymer according to specific needs. It is expected that this forming technique can form polymers where the molar ratio between the siloxyl or silyl units to the boranyl units can vary form 99:1 to 0:100. Preferred ranges are from 95:5 to 40:60 with a more preferred range from 95:5 to 80:20. An optimum ratio appears to be about 90:10.

Another way to modify the chemical composition of the polymer is to vary the manner by which the repeating units are arranged. The siloxyl or silyl units and the boranyl units can be arranged in either random occurrences between each other or in the form of interdispersed block-type structures of each unit.

These linear polymers can be readily converted into high temperature thermosetting polymers upon further polymerization through the alkynyl or acetylenic units at a temperature above 150° C. For possible microelectronic applications, copolymer 1 can be cured photochemically or possibly by other radiation treatment methods.

These linear polymers are soluble in most organic solvents, which enhances their importance in potential structural, microelectronic, and nonlinear optical (NLO) applications.

They are designed as polymeric precursors for both high temperature, oxidatively stable thermosets and ceramics. Cross-linking of 1 can occur by thermal or photochemical means through the triple-bonds of the acetylenic units to afford thermosetting polymers.

The relative amount of boron and silicon to the alkynyl unit can be easily varied by controlling the ratio of reactants in the synthesis. An ideal combination of reactants can be found to produce a copolymer needed for a particular application which will be a function of the physical properties desired.

Copolymers containing silyl and boranyl units could exhibit electrical conductivity properties, which could enhanced their importance in the microelectronic industry and as nonlinear optical materials (NLO). Copolymers with various electrical properties could be easily synthesized by varying the substituents on both the boron and silicon units.

Having described the basic aspects of the invention, the following examples are given to illustrate specific embodiments thereof.

EXAMPLES 1–4

EXPERIMENTAL SECTION

All reactions were performed under inert conditions using standard Schlenk line techniques. THF was distilled from benzophenone/sodium prior to use. All chemicals were obtained from Aldrich Chemical Co. and were used as received. Thermogravimetric analyses (TGA) and differential scanning calorimetric analyses (DSC) were performed on a DuPont 951 module and a DuPont 910 calorimeter, respectively, equipped with a DuPont 2100 thermal analyzer. All thermal analyses were performed using heating rates of 10° C./min under air or nitrogen atmosphere with flow rates of 50 cm$^3$/min. Infrared spectra (FTIR) were obtained using a Nicolet Magna 750 spectrophotometer. $^1$H and $^{13}$C NMR were performed on a Bruker AC-300 spectrometer. Elemental analyses were performed by E+R Microanalytical Laboratory, Inc.

A flame-dried 100 ml round bottomed flask, connected to an argon source, was equipped with a magnetic stirbar and septum. Tetrahydrofuran (THF, 8 ml) was injected and the flask placed in a dry ice/acetone bath (~–78° C.). n-Butyllithium (BuLi, 10.2 ml of a 2.5M hexane solution, 26.4 mmol) was then added slowly and the mixture stirred for about 5 minutes. Hexachlorobutadiene (0.99 ml, 6.2 mmol) was then introduced dropwise via syringe over a 10 minute period with stirring. After complete addition, the reaction mixture was stirred at –78 ° C. for 5–10 min, the cold bath was then removed and the reaction mixture was started at room temperature for 2.5 hours to afford a brown mixture following the procedure of Ijadi-Maghsoodi et al in "Synthesis and Study of Silylene-Diacetylene Polymers", *Macromolecules,* vol 23, no. 20 (1990), pp. 4485–4487.

Meanwhile a THF solution of dimethyldichlorosilane (DMS, 0.62 ml, 5.01 mmol) and phenylboron dichloride (PBD, 0.20 ml, 1.41 mmol) in THF was prepared at –78° C.

To this THF solution of PBD and DMS was added via cannula the brown mixture containing $Li_2C_4$. After complete addition, the reaction mixture was allowed to warm to ambient temperature, stirred 0.5 hour, and then quenched with cold aqueous ammonium chloride. Following cold aqueous workup and extraction with ether, the product was separated, and concentrated under reduced pressure at 85° C. to afford the copolymer 1a, 83% yield of a yellow solid as the copolymer of Example 1. The a, b, c and d values for this copolymer 1 and the values for the next 3 copolymers in Examples 2–4 are given in Table 1.

temperature for conversion of the acetylenic units into a cross-linked system.

Figure 2:
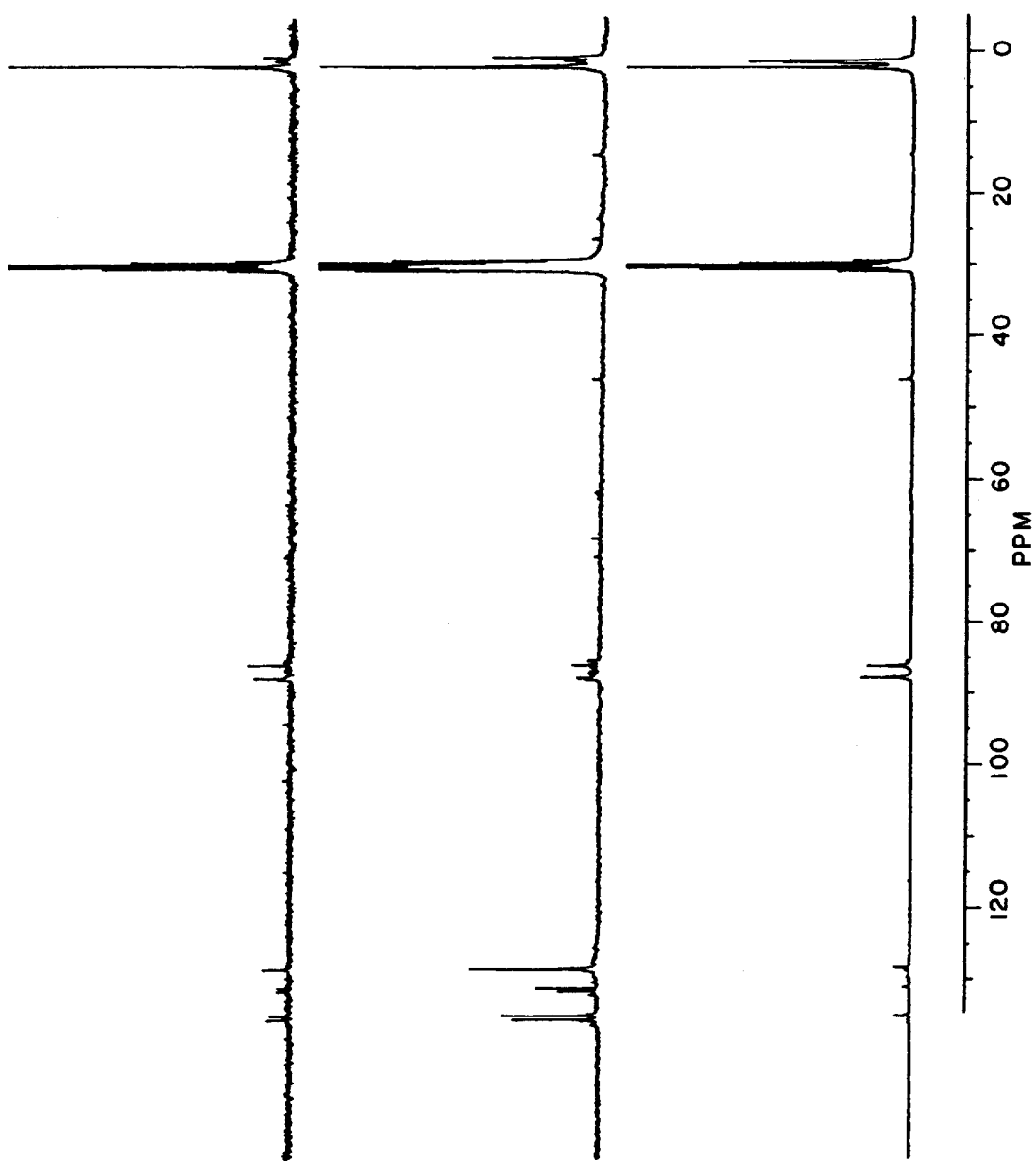
FIG. 2 illustrates NMR analysis of hybrid copolymers according to the invention.
Figure 3:
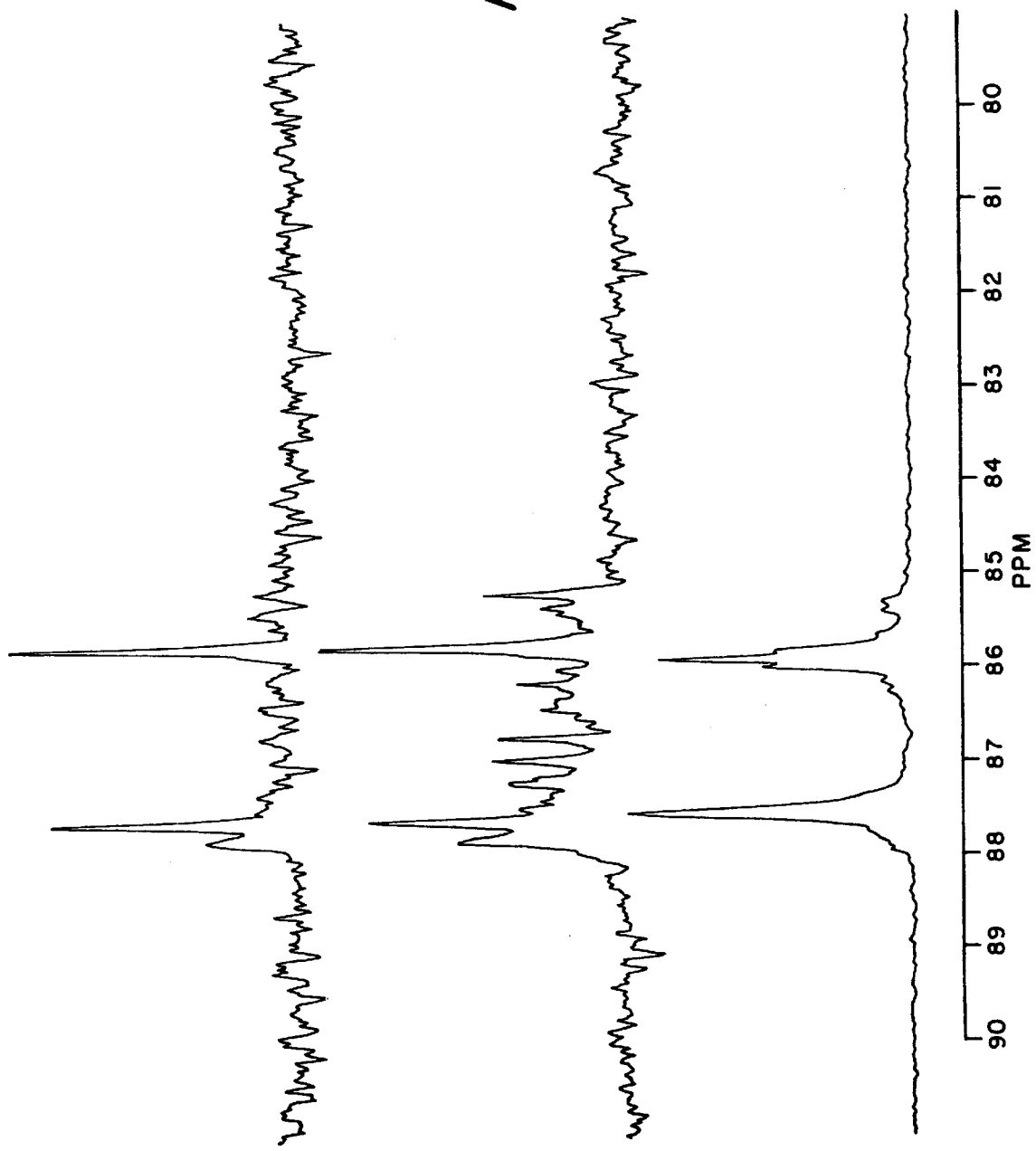
FIG. 3 illustrates NMR analysis in the acetylenic region of hybrid copolymers according to the invention.

Structural confirmations were also obtained by NMR analysis See FIG. 2 where the $^{13}C$ NMR (acetone $d_6$) of hybrid copolymers 1b (top), 1c (middle), and 1d (bottom) are shown. FIG. 3 shows the acetylenic region of $^{13}C$ NMR (acetone $d_6$) spectra for the hybrid copolymers 1b (top), 1c (middle), and 1d (bottom). $^{13}C$ NMR confirmed aromatic carbons (B—Ph) by peak resonances with chemical shifts in the 135–127 ppm range. Acetylenic carbons were identified by peak resonances in the 88–85 ppm region while silylm-

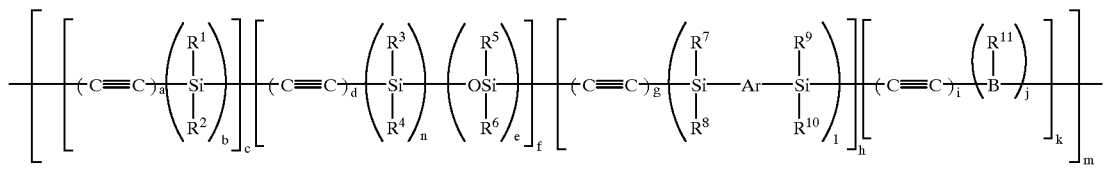

ethyl carbons were observed in the 2–0 ppm region. Splitting of the peaks in the acetylenic region suggests a combination of random microstructure and end group effects. $^1H$ NMR integration and chemical shifts were in agreement with $^{13}C$ NMR and FTIR interpretation. Elemental analysis data were in general agreement with calculated values. The presence of some end groups and/or hydrolysis byproducts can explain slight discrepancies in the data. Elemental analysis variations for these systems are not uncommon.

TABLE 1

| Ex. | Copolymer | d | n | e | i | j | f mole % | k mole % |
|---|---|---|---|---|---|---|---|---|
| 1 | 1a | 2 | 1 | 0 | 2 | 1 | 80 | 20 |
| 2 | 1b | 2 | 1 | 1 | 2 | 1 | 80 | 20 |
| 3 | 1c | 2 | 1 | 1 | 2 | 1 | 90 | 10 |
| 4 | 1d | 2 | 1 | 2 | 2 | 1 | 90 | 10 |
| 5 | 1e | 0 | 0 | 0 | 2 | 1 | 0 | 100 |
| 6 | 1f | 2 | 1 | 1 | 2 | 1 | 60 | 40 |
| 7 | 1g | 2 | 1 | 1 | 2 | 1 | 50 | 50 |

Copolymers 1b–d (example 2–4) were similarly prepared using siloxane to boron reagents as follows: 1b: 1,3-dichlorotetramethyldisiloxane (TMDS; 1.00 ml, 4.91 mmol), PBD (0.20 ml, 1.41 mmol); 1c: TMDS (1.15 ml, 5.644 mmol), PBD (0.09 ml, 0.636 mmol); 1d: 1,5-dichlorohexamethyltrisiloxane (HMTS; 1.53 ml, 5.50 mmol), PBD (0.09 ml, 0.636 mmol); giving dark brown products, with yields in the 80 to 85% range. The d, n, e, i, j, f and k values for this copolymer 1 and the values for the next 6 copolymers in Example 2–7 are given in Table 1. Polymer 1e was synthesized by the same procedure using PBD (0.89 ml, 6.274 mmol) so that it contained just the boranyl units and no siloxyl or silyl units. Copolymer 1f: TMDS (0.75 ml, 3.681 mmol), PBS (0.33 ml, 2.326 mmol) and 1g: TMDS (0.62 ml, 3.044 mmol), PBS (0.41 ml, 2.891 mmol).

Figure 4:
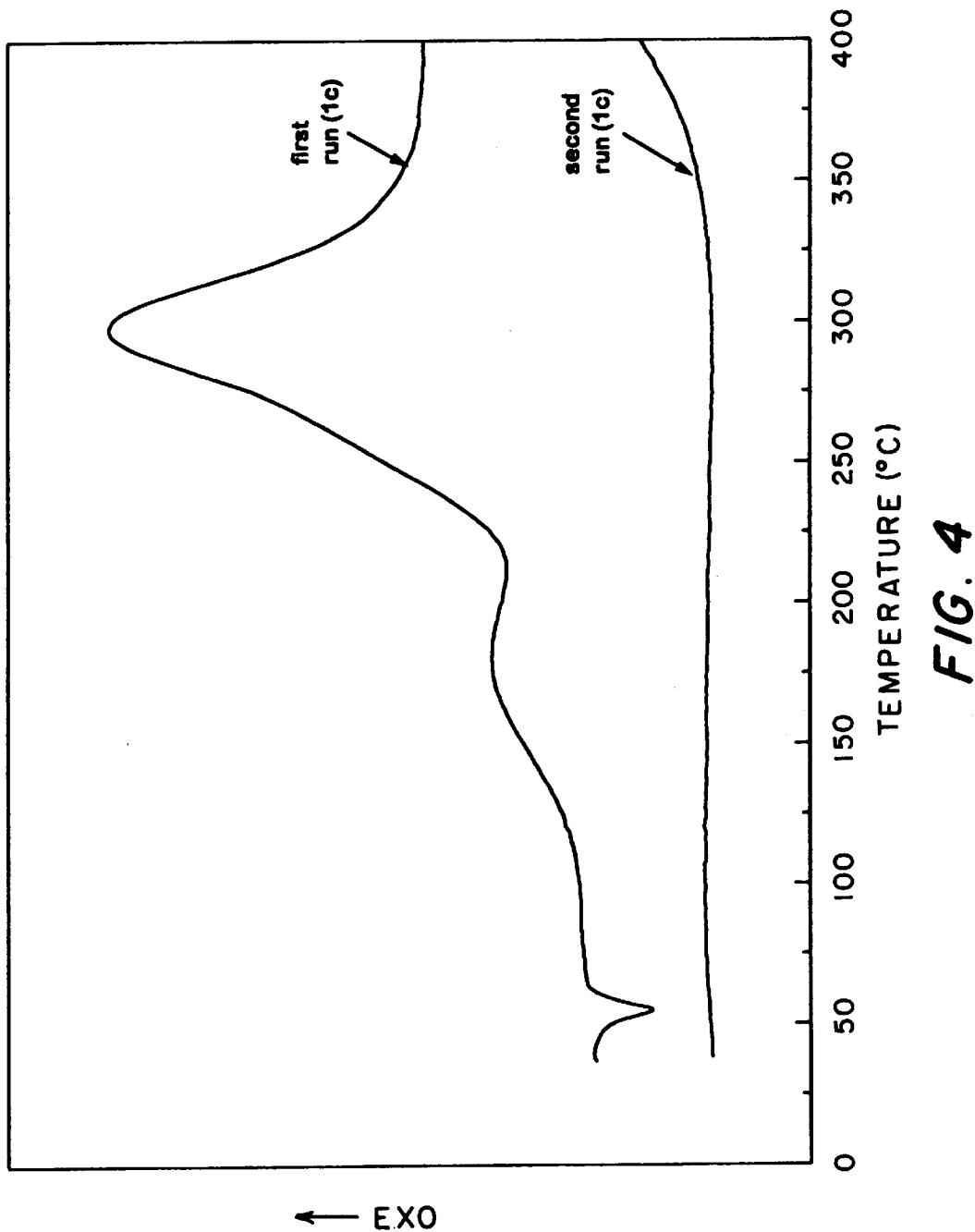
FIG. 4 illustrates DSC analyses for the copolymer 1c according to the invention.

The structures of the copolymers were confirmed by infrared (FTIR) spectroscopy, which showed strong acetylene stretching (2070 cm$^{-1}$), and strong Si—O—Si stretching (1070 cm$^{-1}$), and strong Si—C deformation (1270, 840, and 810 cm$^{-1}$) absorptions, as shown in FIG. 1 where the FTIR spectra (absorbance) of hybrid copolymers 1a (top), 1b (upper middle), 1c (lower middle) and 1d (bottom) as set forth. The presence of trace amounts of terminal acetylenic end groups was indicated by a small absorbance at 3300 cm$^{-1}$. The presence of boron was confirmed by in absorbance at 1450 cm$^{-1}$ (B—Ph). The presence of B—OH end groups or hydrolysis by-products was indicated by small absorbances in the 1345–1335 cm$^{-1}$ region. When a sample of 1a was heated to 400° C. and the residue analyzed by FTIR spectroscopy, acetylenic absorptions were not observed in either the 3300 or 2070 cm$^{-1}$ region. Thus, heating to 400° C. is interpreted as an adequate enough The copolymers displayed thermal characteristics typical of diacetylenic systems. Differential scanning calorimetric (DSC) analyses of copolymers 1a–d to 400° C. under inert conditions showed exotherms having onsets in the 200–225° C. temperature range and peak maxima in the 285–300° C. range. These exotherms were interpreted as the reaction of the internal diacetylenic functionalities. Small exotherms (5–10% of main exotherm) were also observed with peak maxima around 165° C. and were attributed to reaction of trace quantities of terminal acetylenic moieties. Thermal treatment of a copolymer at 160° C. for 2–5 minutes resulted in the disappearance of the small exotherm. Further analysis of the residues via a second DSC run showed featureless thermograms, indicating no further cross-linking attributed to the acetylenic functionalities and hence completeness of the initial reaction. Only copolymer 1c displayed a melting point at 55.4° C. as seen in FIG. 4, while no melting/softening transitions were observed for the copolymers 1a and 1b. Copolymer 1d is a viscous liquid at room temperature.

The mole percent ratios of silane/siloxane (DMS, TMDS, and HMTS) units to boron (PBD) units in these Examples 1–4 are 90:10 and 80:20. It is expected that this forming technique can form polymers where the ratio can vary form 99:1 to 0:100. Preferred ranges are from 95:5 to 40:60 with a more preferred range from 95:5 to 80:20. An optimum ratio appears to be about 90:10.

The isolated copolymers (1a–c) were solids at room temperature whereas 1d, containing the longer trisiloxane group, was a viscous liquid.

FIG. 5 shows TGA thermograms of copolymers 1a–d heated to 1,000° C. under a nitrogen atmosphere at 10° C./min. Char yields of 77.4, 75.0, 72.1 and 44.4% were obtained for 1a–d, respectively. The char yields observed decreased with increasing siloxane spacer group length, DMS (1a: 77.4 wt %), TMDS (1b and 1c: 75.0 and 72.1 wt %), and HMTS (1*d*: 44.4 wt %). This is consistent with reported trends that increasing the siloxane spacer group length lowers the thermal stabilities of the resultant polymeric systems. Oxidative stability determinations were obtained by heating the charred residues in air to 1,000° C. and monitoring the weight retained. Weight residues of 63.8, 94.7, and 81.3% were obtained for copolymers 1*a–c*, respectively as shown in FIG. 6.

In summary, boron-silicon-diacetylenic copolymers were synthesized and characterized. Those diacetylenic copolymers having various ratios of silane/siloxane and boron were evaluated for thermal and oxidative properties. The diacetylenic functionalities were found to cross-link thermally to give stable networks at elevated temperatures. The effects of silicon and boron incorporated into the host diacetylenic polymers were found to enhance their oxidative stabilities. Aging studies, performed on a thermoset and a ceramic residue and prepared from hybrid copolymer 1*c*, showed these materials to have exceptional oxidative stabilities. Thus, these hybrid polymers show promise as materials for applications requiring high-temperature stability.

It is understood that the foregoing detailed description is given merely by way of illustration and that many variations may be made therein without departing from the spirit of this invention. wherein the boron containing units in the molar percent amount k and the silicon containing units in the molar percent amounts c, f and h can be arranged in either random occurrences between each other or in the form of interdispersed block-type structures of each unit.

What is claimed is:

1. An organoboron polymer with a backbone having a repeating unit comprising at least one alkynyl group, at least one silyl group, at least one boranyl group, optionally at least one siloxyl group, and optionally an aryldisilyl group wherein said repeating unit is represented by the formula

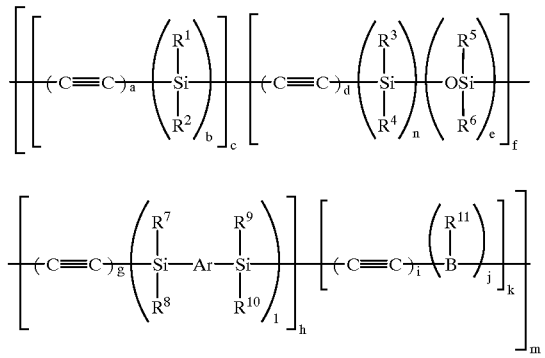

wherein
(1) c, f, h and k are mole percent and add together to 100 mole percent with the ratio of the sum of c, f and h to k not greater than 99:1;
(2) a, b, d, e, g, i, j, l and n are each an integer greater than zero;
(3) m is an integer equal to or greater than 1;
(4) wherein $R^1$ through $R^{10}$ are independently selected from the group consisting of
a haloalkyl having up to 20 carbon atoms;
a haloaryl group having up to 20 carbon atoms; and
an alkyl, aryl, or alkylaryl hydrocarbon group having up to 20 carbon atoms; and
(5) $R^{11}$ is an alkyl, aryl or alkylaryl hydrocarbon group having up to 20 carbon atoms;
(6) Ar is a substituted or unsubstituted aromatic diradicals having 4 or fewer aromatic rings; and
wherein the boron containing units in the molar percent amount k and the silicon containing units in the molar percent amounts c, f and h can be arranged in either random occurrences between each other or in the form of interdispersed block-type structures of each unit.

2. An organoboron polymer according to claim 1, wherein a is 2, b is 1 and i is 2.

3. An organoboron polymer according to claim 1, wherein d is 2, e is 1 and i is 2.

4. An organoboron polymer according to claim 1, wherein d is 2, e is 2 and i is 2.

5. An organoboron polymer according to claim 1, wherein i is 2 and c, f and h are 0.

6. An organoboron polymer according to claim 1, wherein the molar ratio between the sum of c, f and h to k ranges from 95:5 to 80:20.

7. An organoboron polymer according to claim 6, wherein the molar ratio between the sum of c, f and h to k is about 90:10.

8. A method of preparing a linear organoboron copolymer having a repeating unit represented by the formula

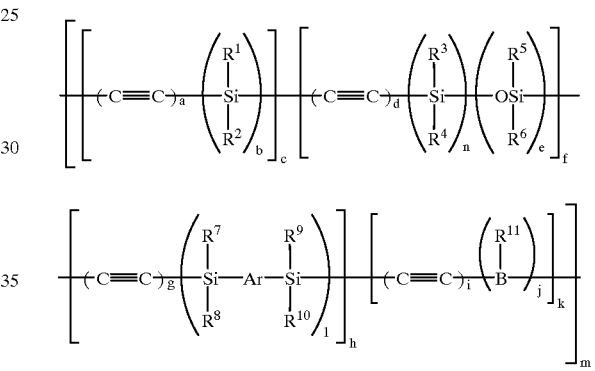

wherein
(1) c, f, h and k are mole percent and add together to 100 mole percent with the ratio of the sum of c, f and h to k varying from 99:1 to 0:100;
(2) a, b, d, e, g, i, j, l and n are each an integer greater than zero;
(3) m is an integer equal to or greater than 1;
(4) wherein $R^1$ through $R^{10}$ are independently selected from the group consisting of
a haloalkyl having up to 20 carbon atoms;
a haloaryl group having up to 20 carbon atoms; and
an alkyl, aryl, or alkylaryl hydrocarbon group having up to 20 carbon atoms; and
(5) $R^{11}$ is an alkyl, aryl or alkylaryl hydrocarbon group having up to 20 carbon atoms;
(6) Ar is a substituted or unsubstituted aromatic diradicals having 4 or fewer aromatic rings; and
wherein the boron containing units in the molar percent amount k and the silicon containing units in the molar percent amounts c, f and h can be arranged in either random occurrences between each other or in the form of interdispersed block-type structures of each unit; comprising the steps of reacting a salt or Grignard agent having the formula

wherein (1) M is selected from the group consisting of Li, Na, K and MgX where X is selected from the group consisting of F, Cl Br, and I, (2) n is a positive integer of 1 or greater; with appropriate members selected from

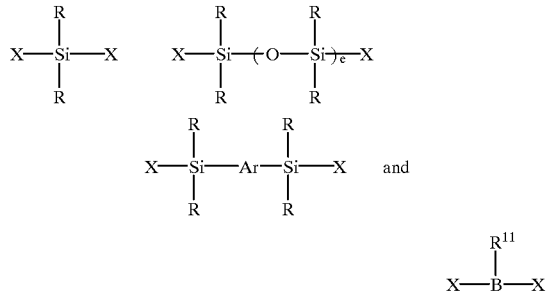

wherein (1) Ar, e, X, and $R^{11}$ are as previously indicated and R is as $R^1$ through $R^{10}$ are defined.

9. The method of claim 8, wherein a is 2, b is 1 and i is 2.

10. The method of claim 8, wherein d is 2, e is 1 and i is 2.

11. The method of claim 8, wherein d is 2, e is 2 and i is 2.

12. The method of claim 8, wherein i is 2 and c, f and h are 0.

13. The method of claim 9, wherein the molar ratio between the sum of c, f and h to k ranges from 95:5 to 80:20.

14. The method of claim 9, wherein the molar ratio between the sum of c, f and h to k is about 90:10.

* * * * *